June 26, 1923. 1,460,074
C. S. OLDROYD
MOTOR DRIVEN TRUCK
Original Filed May 30, 1917   5 Sheets-Sheet 1
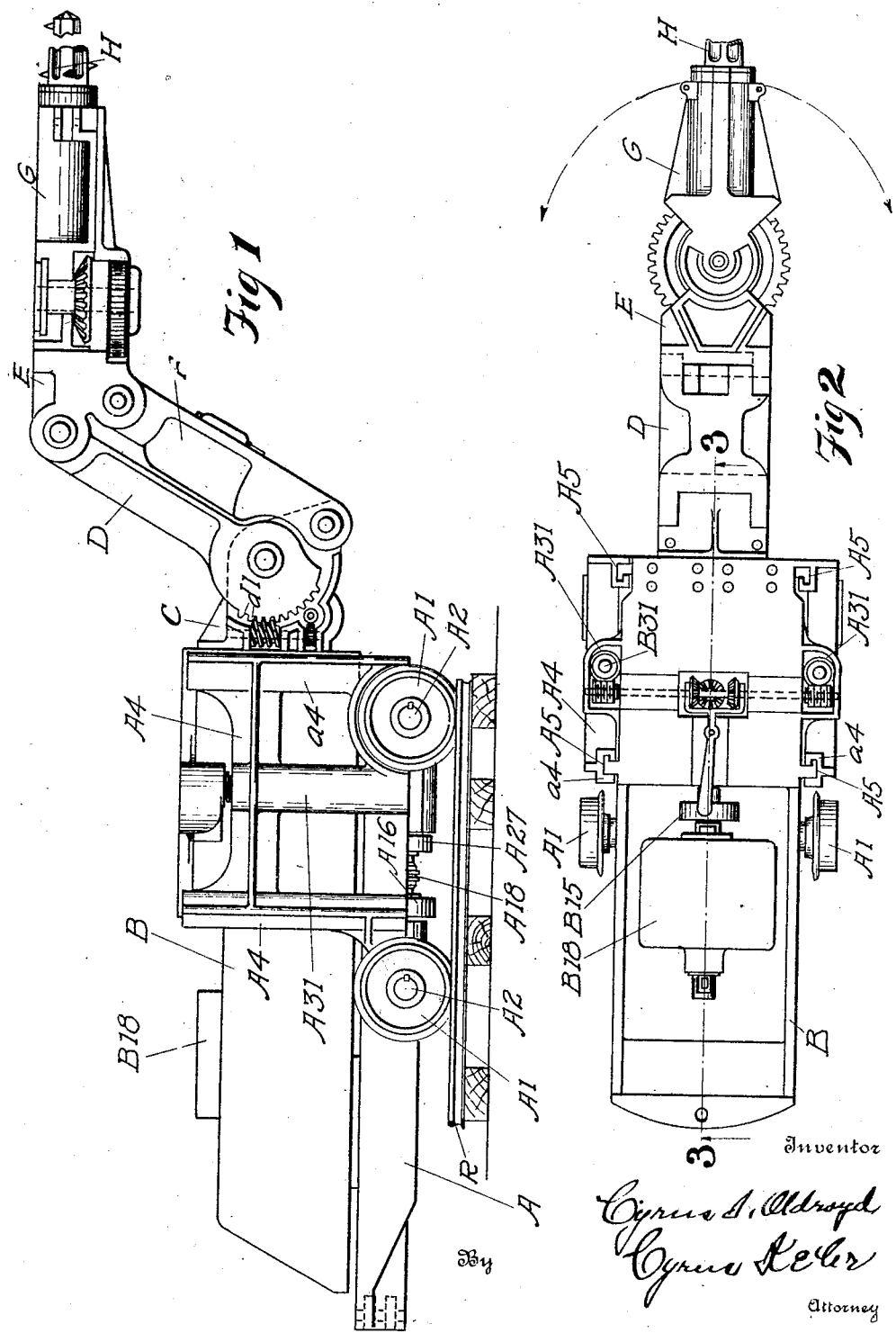

June 26, 1923.

C. S. OLDROYD 1,460,074

MOTOR DRIVEN TRUCK

Original Filed May 30, 1917   5 Sheets-Sheet 2

Inventor
Cyrus S. Oldroyd
Cyrus Kehr
Attorney

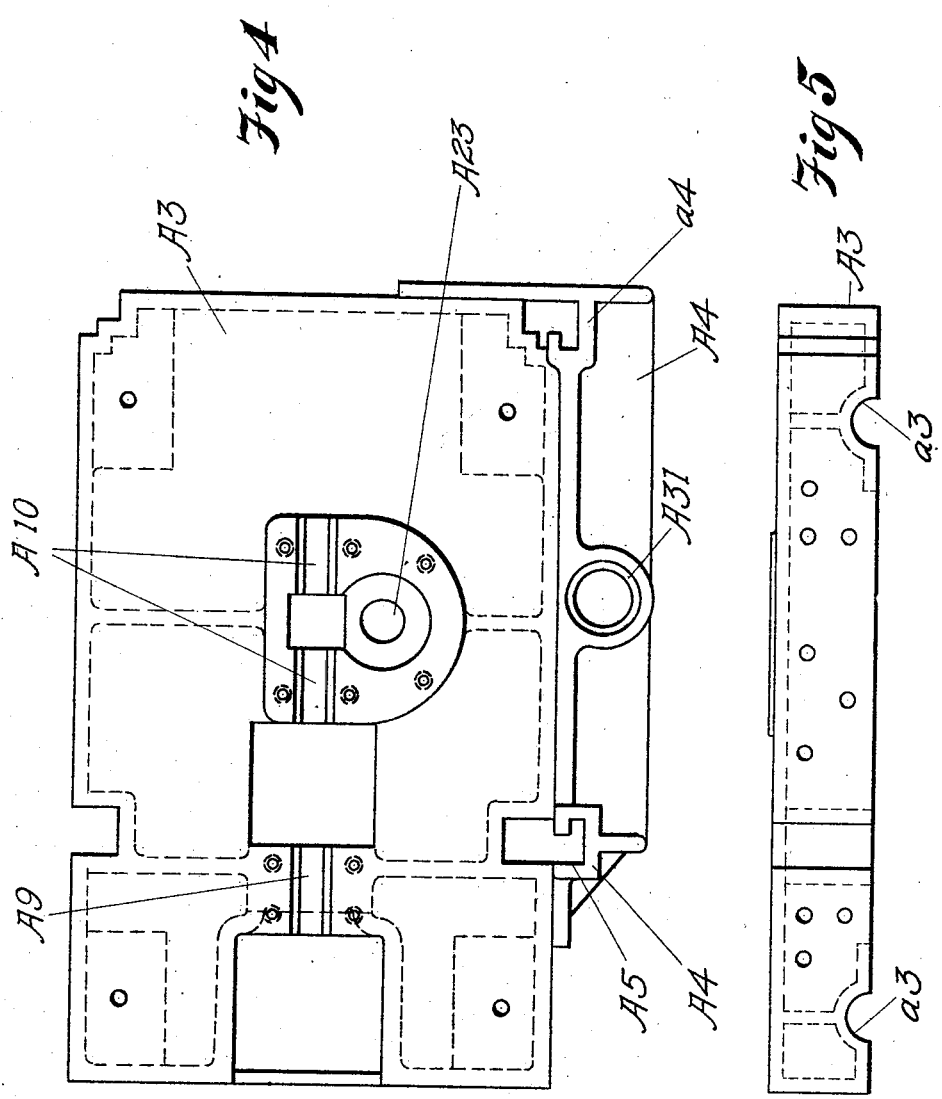

June 26, 1923.
C. S. OLDROYD
1,460,074
MOTOR DRIVEN TRUCK
Original Filed May 30, 1917  5 Sheets-Sheet 4
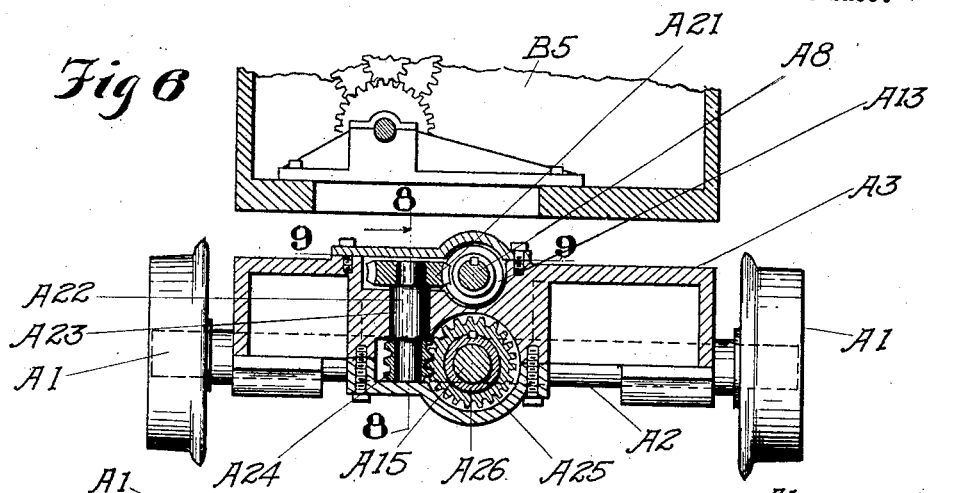
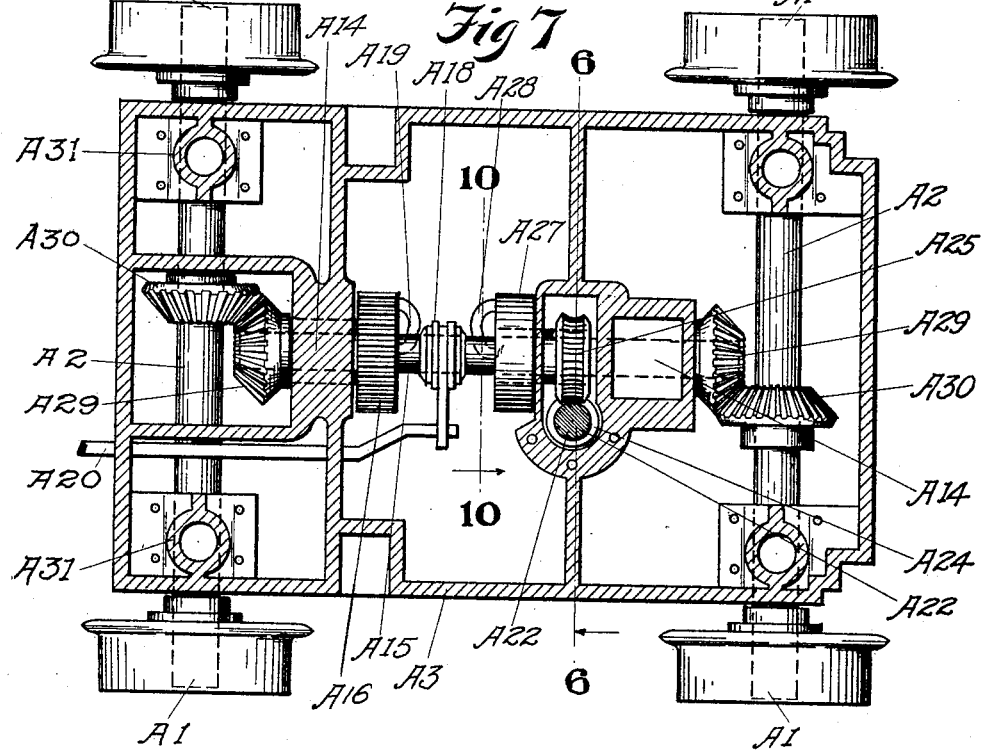
Inventor
Cyrus S. Oldroyd
By Cyrus Kerr
Attorney

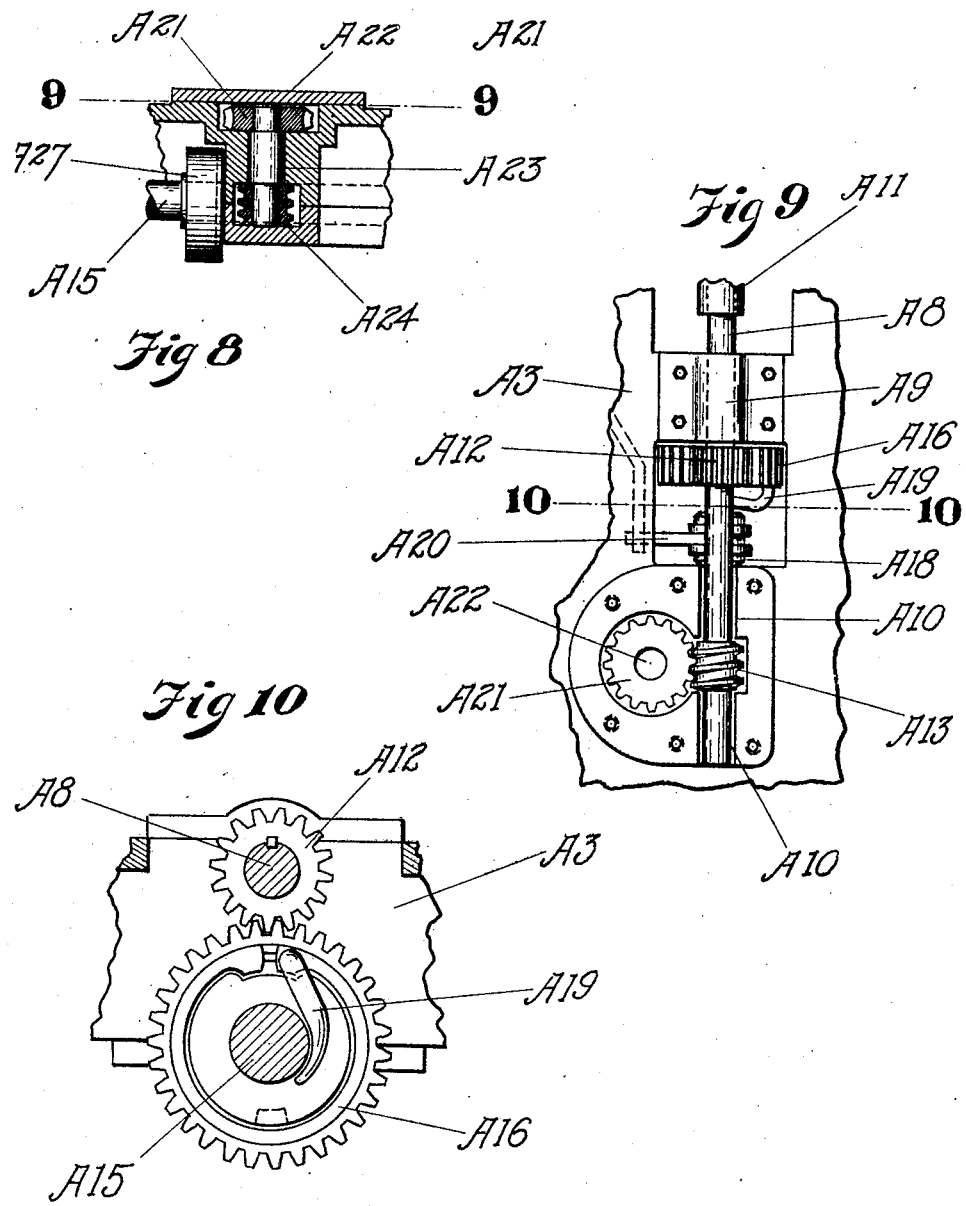

Patented June 26, 1923.

1,460,074

UNITED STATES PATENT OFFICE.

CYRUS S. OLDROYD, OF CINCINNATI, OHIO, ASSIGNOR TO OLDROYD MANUFACTURING COMPANY, OF KNOXVILLE, TENNESSEE, A CORPORATION OF TENNESSEE.

MOTOR-DRIVEN TRUCK.

Original application filed May 30, 1917, Serial No. 166,172. Divided and this application filed May 16, 1919. Serial No. 297,501. Renewed December 11, 1922.

*To all whom it may concern:*

Be it known that I, CYRUS S. OLDROYD, a citizen of the United States, residing at Cincinnati, in the county of Hamilton and State of Ohio, have invented a new and useful Improvement in Motor-Driven Trucks, of which the following is a specification, reference being had to the accompanying drawing.

My improvement relates particularly to motor driven trucks forming parts of machines used for cutting into upright walls of coal, rock, or similar material, the machine comprising cutting means actuated by the machine and projected endwise into the wall of coal, or other material, and then moved sidewise to make a sweeping cut; the machine being, however, adapted to cut in a variety of other ways.

This application is a division of my application for Letters Patent of the United States, Serial Number 166,172, filed May 3, 1917, for an improvement in mining and quarrying machines. This application relates particularly to the truck and the body supported thereby and to means for transmitting power to the truck-supporting wheels for propelling the machine.

In the accompanying drawings,

Fig. 1 is an elevation of the right-hand side of a machine embodying my improvement;

Fig. 2 is a plan of the same machine on a smaller scale;

Fig. 4 is a plan of the truck platform, one of the upright side members being attached to the platform;

Fig. 5 is an elevation of the right-hand side of said platform;

Fig. 6 is an upright, transverse section on the line, 6—6, of Fig. 7, looking in the direction of the arrow, a portion of the superposed structure being added;

Fig. 7 is a horizontal section on the line, 7—7, of Fig. 3;

Fig. 8 is an upright section on the line, 8—8, of Fig. 6, looking in the direction of the arrow;

Fig. 9 is a horizontal section on the line, 9—9, of Figs. 6 and 8, looking downward, more parts being shown than appear in Fig. 8;

Fig. 10 is an upright section on the line, 10—10, of Figs. 7 and 9, looking in the direction of the arrow, the parts being shown to a larger scale.

Figure 3:
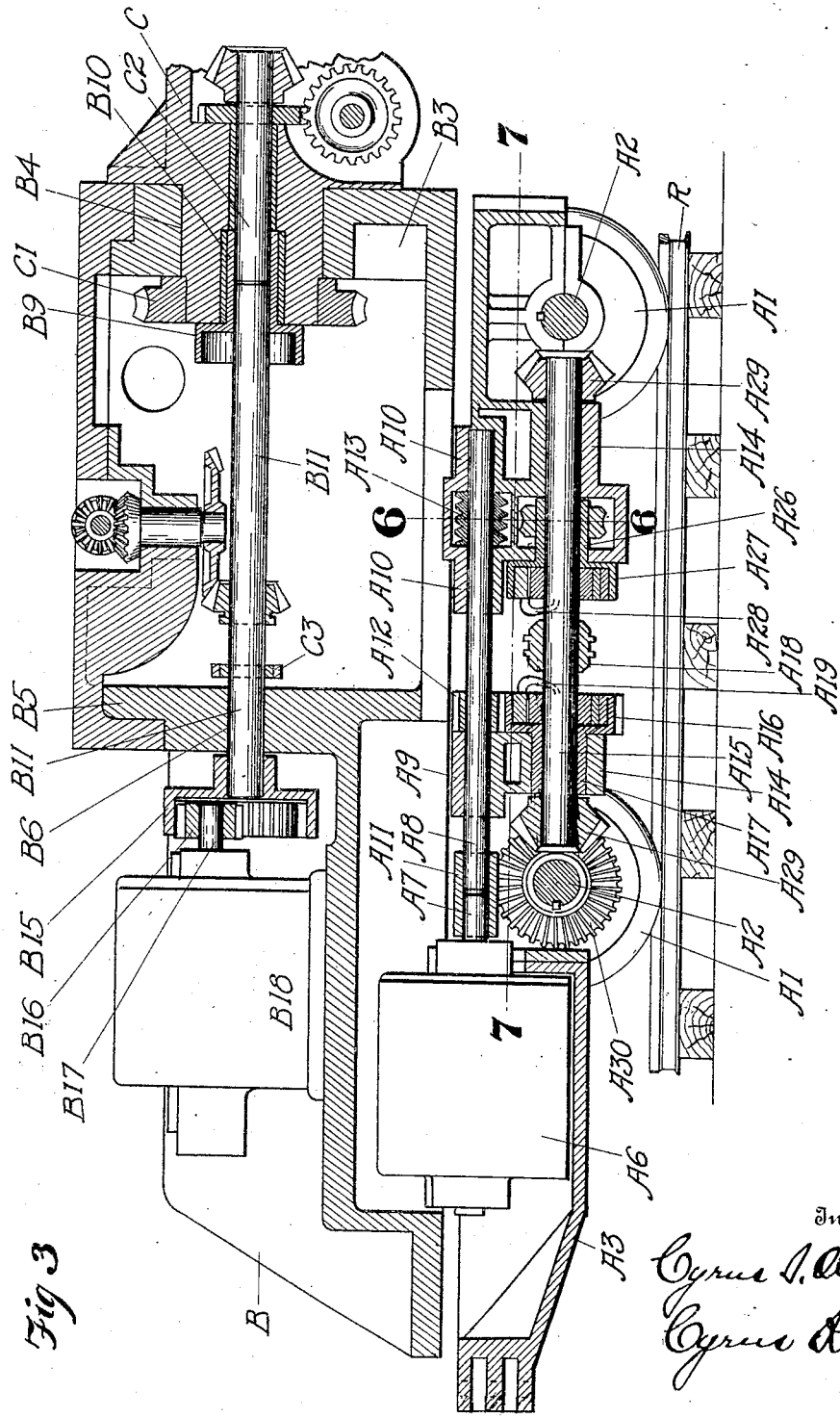
Fig. 3 is an enlarged upright section on the line, 3—3, of Fig. 2, looking in the direction of the arrow.

Referring to said drawings, A designates the truck; B designates the longitudinal body which is movable up and down on the truck; C designates the neck which is supported on the forward end of said body and rotatable on an axis which is horizontal and parallel to the body, B, and the track rails, R; D is the inner arm hinged to said neck; E is the head hinged to the inner arm; F is a parallel link co-operating with the inner arm in supporting the head; G is the forward arm, and H is the cutting tool.

The truck comprises supporting or traction wheels, $A^1$, which are in the form of ordinary mine car wheels and mounted on axles, $A^2$. $A^3$ is a horizontal truck platform supported on said axles upon which is supported the body, B. The platform is shown in the form of a rectangle with downwardly directed flanges along its four edges. To each side flange of the platform is bolted the lower portion of an upright cast metal side member, $A^4$, comprising two guide standards, $a^4$, and an upright socket or barrel, $A^{31}$. Each of said guide standards is provided with an upright channel, $A^5$, directed toward the corresponding standard at the opposite side of the truck platform. The body, B, rests between said side members and has upright tongues extending into the channels, $A^5$, of said guide standards so as to permit up and down movement of said tongues in said channels, as described in my above-mentioned application.

An electric motor, $A^6$, furnishes power for propelling the truck. The motor is seated on the rear portion of the truck platform and has a shaft, $A^7$, extending forward horizontally and transversely to the truck axles, $A^2$. In line with and abutting endwise against the end of the motor shaft is the motor shaft extension, $A^8$, which rests in bearings, $A^9$ and $A^{10}$. A sleeve coupling, $A^{11}$, joins the meeting ends of said shafts. On the extension shaft, $A^8$, immediately at the front of the bearing, $A^9$, is a spur gear pinion, $A^{12}$;

and between the two bearings, $A^{10}$, is a worm, $A^{13}$.

Between the truck axles, $A^2$, the truck platform has bearings, $A^{14}$, extending downward and surrounding the shaft, $A^{15}$, which extends from one of said axles to the other. On said shaft is a spur gear wheel, $A^{16}$, which meshes with the spur gear pinions, $A^{12}$, on the shaft, $A^8$. Said wheel, $A^{16}$, is loose on the shaft, $A^{15}$, and has a sleeve, $A^{17}$, extending into the bearing, $A^{14}$. Said wheel, $A^{16}$, forms the external member of an expansion friction clutch. Forward of said wheel is a sliding cam member, $A^{18}$, adapted to turn the arm, $A^{19}$, of the clutch for expanding the expansion member of the clutch (Figs. 3, 7 and 10).

A shift lever, $A^{20}$, is coupled to the sliding cam member, $A^{18}$, for shifting the latter endwise on the shaft, $A^{15}$ (Fig. 7). When the cam in the spur gear wheel, $A^{16}$, is closed, said wheel transmits motion to the shaft, $A^{15}$.

The worm, $A^{13}$, meshes with a horizontal worm wheel, $A^{21}$, which is on an upright shaft, $A^{22}$, which rests in a bearing, $A^{23}$. On the lower end of the shaft, $A^{22}$, is a worm wheel, $A^{25}$, which surrounds a clutch sleeve, $A^{26}$, and which is rigid on the outer member of an expansion friction clutch, $A^{27}$. Said worm wheel is keyed to said sleeve, and said sleeve is loose on the shaft, $A^{15}$. The inner member of the expansion friction clutch is keyed to said shaft. Said clutch is closed by the forward movement of the sliding cam member, $A^{18}$, said member engaging the arm, $A^{28}$, of the clutch, $A^{27}$, and turning said arm for expanding the expansion member of the clutch, the clutch, $A^{27}$, being a duplicate of the clutch, $A^{16}$. When said clutch is closed, motion is transmitted from the shaft, $A^8$, through the worm, $A^{13}$, the worm wheel, $A^{21}$, the shaft, $A^{22}$, the worm, $A^{24}$, the worm wheel, $A^{25}$, and the clutch, $A^{27}$, to the shaft, $A^{15}$.

When the sliding cam member, $A^{18}$, is in its middle position, the clutch, $A^{16}$, and the clutch, $A^{27}$, are both open and no motion is transmitted to the shaft, $A^{15}$.

The shaft, $A^{15}$, transmits motion to the axles, $A^2$, through bevel gears, $A^{29}$, fixed on the shaft, $A^{15}$, and bevel gears, $A^{30}$, located on the axles, $A^2$, and meshing with the gears, $A^{29}$ (see Figs. 3 and 6).

The transmission through the gears, $A^{12}$ and $A^{16}$, is for ordinary propulsion of the machine when it is not cutting. The transmission through the worms and worm gears is used when the machine is to be propelled slowly while the cutting mechanism is cutting. The direction of propulsion is changed by reversing the motor, $A^6$. This motor, $A^6$, is used only for the propulsion of the machine. When the machine is at rest, this motor is cut out.

The neck, C, rests in the bearing, $B^4$, and extends rearward through said bearing and is there surrounded by a worm gear wheel, $C^1$, which bears against the rear face of the front cross wall, $B^3$. By this means the forward movement of said neck is prevented. Immediately at the rear of the worm wheel, $C^1$, is a member of an expansion friction clutch, $B^9$, which has a sleeve, $B^{10}$, extending forward into the neck, C. A shaft, $C^2$, lying within the neck, C, extends rearward into the forward portion of said sleeve and is keyed to said sleeve, so that the outer member of said clutch and said sleeve and said shaft must rotate in unison. At the rear of the neck shaft, $C^2$, the sleeve, $B^{10}$, receives and forms a bearing for the forward end of a transmission shaft, $B^{11}$. The rear portion of said shaft rests in the bearing, $B^6$, in the rear cross wall, $B^5$.

The rear end of the shaft, $B^{11}$, projects through the bearing, $B^6$, and is there surrounded by the hub of an internal spur gear wheel, $B^{15}$, which meshes with a pinion, $B^{16}$, which is located within the gear, $B^{15}$, and surrounds and is keyed to the axle, $B^{17}$, of the electric motor, $B^{18}$, which is supported on the body, B. When said motor is running, it drives the transmission shaft, $B^{11}$, and said shaft drives the shaft, $C^2$, and that shaft transmits motion to the cutting mechanism, as described in my above-mentioned application.

The mechanism employed for raising and lowering the body, B, on the truck is also described in said application.

The mechanism for rotating the neck, C, is also described in said application.

I claim as my invention,

1. In a truck of the nature described, the combination of carrying wheels, axles on which said carrying wheels are mounted, a first shaft transverse to said axles, gearing connecting said shaft to one of said axles, a motor, a second shaft driven by the motor and located parallel to the first mentioned shaft, a third shaft transverse to the first and the second shafts, and worm gearing connecting the first shaft to the third shaft and the third shaft to the second shaft for reduction of velocity from the second shaft to the first shaft, substantially as described.

2. In a truck of the nature described, the combination of carrying wheels, axles on which said carrying wheels are mounted, a first shaft transverse to said axles, gearing connecting said shaft to one of said axles, a motor, a second shaft driven by the motor and located parallel to the first-mentioned shaft, a third shaft transverse to the first and the second shafts, two normally open clutches on said first shaft, means controlled by the operator for closing either of said clutches, gearing connecting the first of the clutches and said second shaft for transmitting motion from the second shaft to the first shaft, and reduction gearing connecting the second of said clutches and the third shaft and the third shaft to the second shaft, substantially as described.

3. In a truck of the nature described, the combination of carrying wheels, axles on which said carrying wheels are mounted, a first shaft transverse to said axles, gearing connecting said shaft to one of said axles, a motor, a second shaft driven by the motor and located parallel to the first-mentioned shaft, a third shaft transverse to the first and the second shafts, two normally open clutches on said first shaft, means controlled by the operator for closing either of said clutches, gearing connecting the first of the clutches and said second shaft for transmitting motion from the second shaft to the first shaft, and worm gearing connecting the second of said clutches and the third shaft and the third shaft to the second shaft, substantially as described.

In testimony whereof I have signed my name, this 7th day of May, in the year one thousand nine hundred and nineteen.

CYRUS S. OLDROYD.